Aug. 6, 1940.  F. H. MUELLER  2,210,335
VALVE
Filed Jan. 25, 1939  2 Sheets-Sheet 2

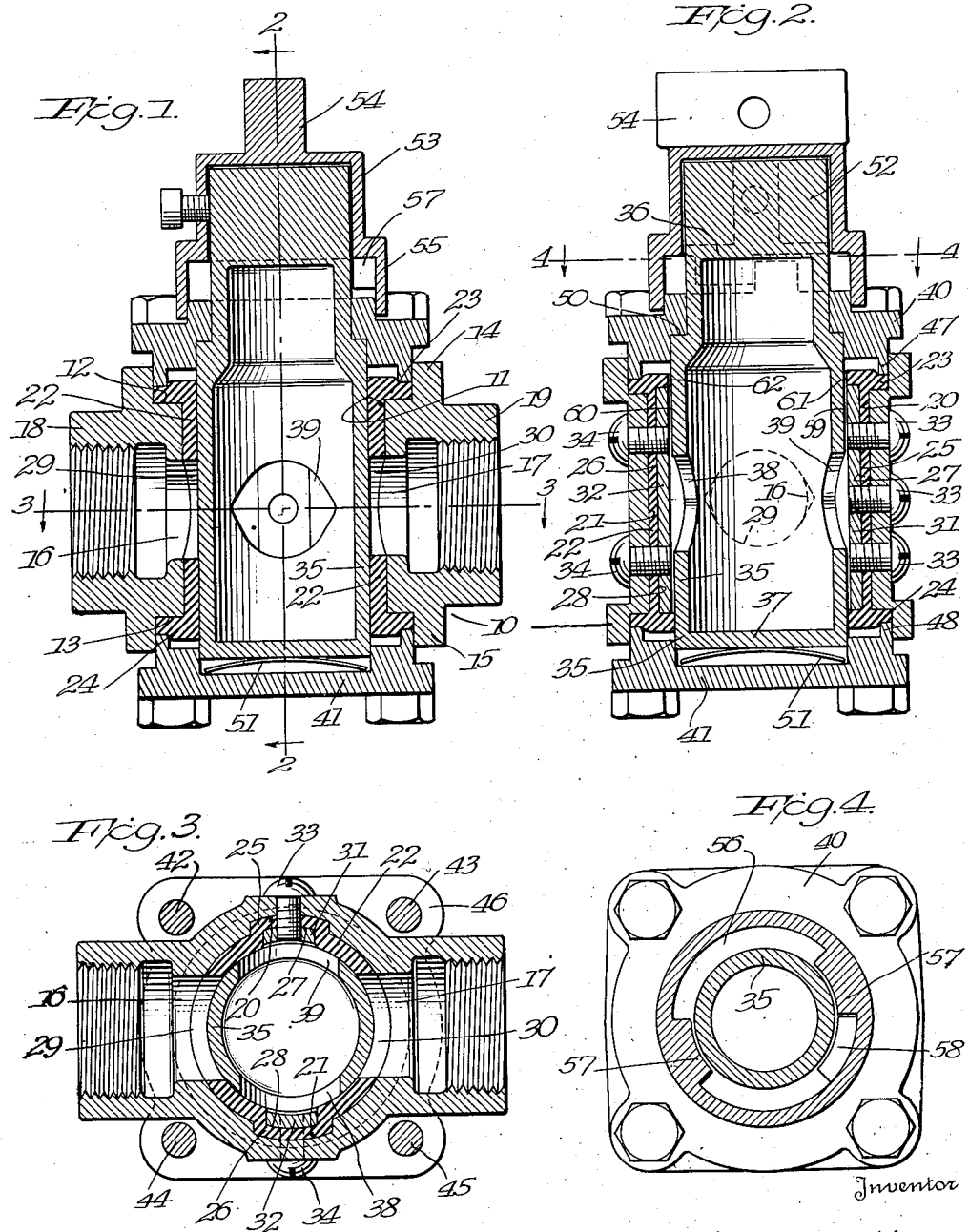

Inventor
Frank H. Mueller

Patented Aug. 6, 1940

2,210,335

UNITED STATES PATENT OFFICE 2,210,335

VALVE

Frank H. Mueller, Decatur, Ill., assignor to Mueller Co., Decatur, Ill., a corporation of Illinois Application January 25, 1939, Serial No. 252,810

6 Claims. (Cl. 251—113)

This invention relates to valves and has as its particular object to provide a rotary plug valve of superior durability and efficiency in use. To this end the new valve includes a casing body having a chamber lined by a sleeve of flexible material within which the plug is rotatable for the control of flow, a main feature of the arrangement being that the pressure of fluid in a line connected to the casing body will cause the sleeve to be pressed or collapsed against the plug in a manner to provide an effective seal, while at the same time the fluid is prevented from flowing past the sleeve between the liner and the chamber walls.

In order that the invention may be clearly understood, I shall describe it with reference to one practical embodiment shown by way of example in the accompanying drawings in which:

Figure 1 is a section of the valve through the plug axis;

Figure 2 is a section substantially on the line 2—2 of Figure 1;

Figure 3 is a section substantially on line 3—3 of Figure 1;

Figure 4 is a section substantially on the line 4—4 of Figure 2;

Figure 5:
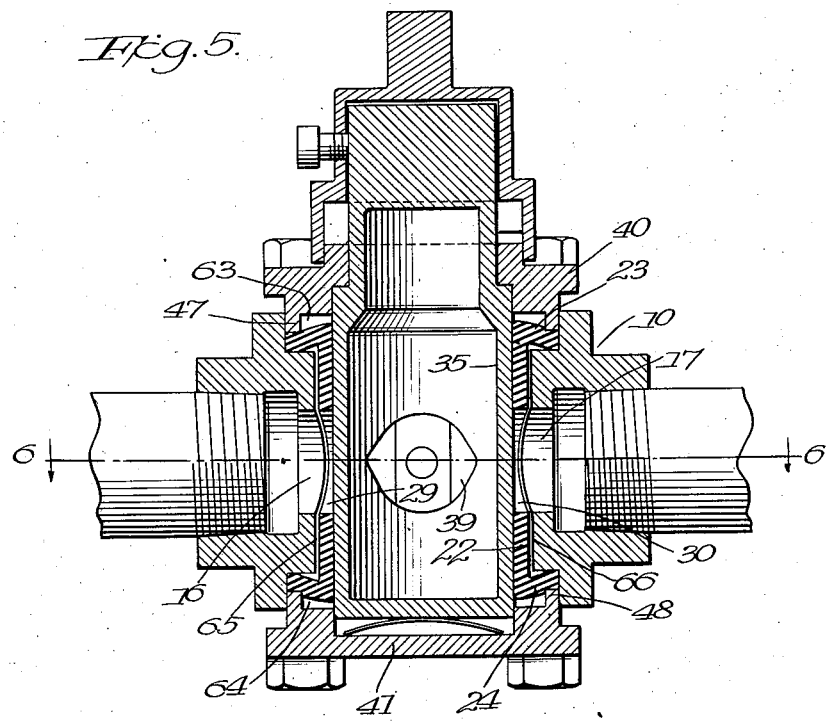
Figure 5 is a view similar to that of Figure 1 but showing the valve connected in a pressure fluid line.

Referring to the drawings, reference numeral 10 designates a casing body provided with a chamber 11, here shown as cylindrical, which terminates in annular shoulders 12 and 13 which are surrounded respectively by upstanding flanges 14 and 15 whose inner walls are concentric with the chamber 11. Lateral ports 16 and 17 communicate with chamber 11 and, as here shown, are diametrically opposite each other and debouch into coupling portions 18 and 19 respectively. The coupling portions as here shown are constituted by internally threaded extensions, although any other desired type may, of course, be utilized.

The chamber walls are provided, as here shown, with diametrically opposite axially extending recesses 20 and 21 which extend between the end shoulders 12 and 13 midway between ports 16 and 17, Figures 2 and 3.

Chamber 11 is lined by a sleeve 22 of flexible rubber and by the term "rubber," I mean any suitable composition whether of natural or synthetic rubber. The sleeve 22 includes outwardly projecting annular end flanges 23 and 24 which overlie and substantially completely cover shoulders 12 and 13 of the casing body. Also, the sleeve is provided externally with integral axially extending diametrically opposite ribs 25 and 26 whose ends join the flanges 23 and 24. Ribs 25 and 26 are of a size to be received in recesses 20 and 21 of the casing body in the manner most clearly shown in Figures 2 and 3. Interiorly, sleeve 22 is provided with grooves 27 and 28 which extend lengthwise of ribs 25 and 26 and terminate at about the level of shoulders 12 and 13 of the casing body when the sleeve is applied thereto in the manner shown in Figure 2. Midway between ribs 25 and 26, sleeve 22 is provided with openings 29 and 30 which register with ports 16 and 17 of the casing body.

Disposed in grooves 27 and 28 of the sleeve are strips 31 and 32 of relatively rigid material, such as a suitable metal. As here shown, the strip 31 is engaged by three screws 33 passed through registering openings in the chamber wall and sleeve 22 into threaded openings in the strip. Strip 32 is similarly engaged by two screws 34.

Rotatable within sleeve 22, which, as here shown, is interiorly cylindrical, is a cylindrical plug 35 here shown as being hollow although closed at its ends by the walls 36 and 37. The plug is provided with diametrically opposite ports 38 and 39 adapted to register with the sleeve openings 29 and 30 to permit flow or to be turned 90° to the position shown in Figures 1 to 3 for the purpose of cutting off flow.

End caps 40 and 41 are secured to the body 10 by means of four bolts 42, 43, 44 and 45, these bolts likewise passing through openings in top and bottom flanges of the body 10, the bottom flange being clearly shown at 46 in Figure 3. Caps 40 and 41 are provided with annular flanges 47 and 48, respectively, which fit within the body flanges 14 and 15 and overlie the outer portions of shoulders 12 and 13 so that when the bolts 42 to 45 are tightened the sleeve flanges 23 and 24 are compressed between the cap flanges 47 and 48 and shoulders 12 and 13 so that a fluid-tight seal is effected between the body 10 and the caps.

Plug 35 has a reduced cylindrical upper portion rotatable in a circular opening in cap 40, and a shoulder 50 at the lower extremity of said reduced portion is seated against a shoulder which surrounds the cap opening by a bowed spring 51 interposed between cap 41 and the bottom wall 37 of the plug. The upper extremity 52 of the plug 35 is squared and received in a similarly contoured socket 53 of a T 54 which is provided for the manipulation of the plug. The socket portion 53 terminates in a skirt 55 within which are formed lugs 56 and 57 which cooperate with a lug 58 formed on cap 40 for the purpose of limiting the angle of rotation of the T to 90°. As is customary, the T is in line with the axis of ports 16 and 17 when the plug is in open position and is in a plane normal to the said axis when the plug is in fully closed position.

Plug 35 has an easy turning fit in sleeve 22 and is substantially in contact with the latter throughout except at the openings and in the zones of strips 31 and 32. These strips are of such thickness relative to the depth of the sleeve recesses that when the screws 33 and 34 are tightened, spaces 59 and 60 will exist between the strips and plug 35. These spaces may be continued upwardly by recesses 61 and 62 formed in the superjacent inner walls of the sleeve.

Assuming plug 35 to be in the closed position of Figure 1 and assuming port 16 to be in connection with a fluid line under pressure, the pressure enters around that portion of the sleeve adjacent port 16 and presses or collapses this portion of the sleeve against the plug body so that a tight seal is effected. However, the pressure cannot pass the axially extending sealing zones defined by the strips 31 and 32 between ports 16 and 17. Pressure cannot build up between the sleeve and the plug since it is relieved by the bleeder passages 59, 61 and 60, 62 and thence upwardly and outwardly between the plug and cap 40, there being preferably no packing between these last named elements. The recesses 61 and 62 may be of any suitable arcuate extent and, as a matter of fact, may be omitted entirely since it has been found in practice that adequate relief will occur in their absence. On the other hand, and particularly if packing is provided between the plug and cap 40, the middle screw 33 may be removed or omitted to provide an outlet for the spaces 59 and 60 which are, of course, in communication with each other through the plug when the plug is in closed position.

Figure 6:
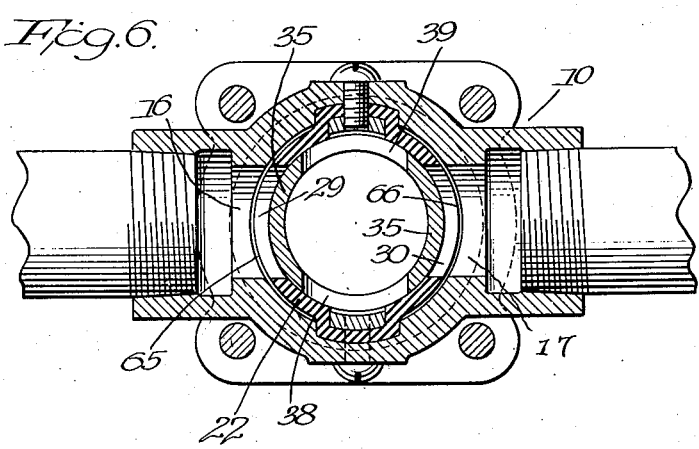
Figure 6 is a section substantially on line 6—6 of Figure 5.

In Figures 5 and 6 the valve is shown connected in a pressure line with the plug in closed position and these figures will give an idea of the behavior of the rubber liner 22 under these conditions.

In tightening the caps 40 and 41 in original assembly, the flanges 47 and 48 are apt to develop some slack in the end flanges 23 and 24 of the liner. Under pressure this slack is taken up by a bulging of the flanges in the axial direction of the plug into the annular spaces 63 and 64 which exist between flanges 47 and 48 and the plug 35. Such bulging will not occur at the ends of the anchoring strips 31 and 32, but will otherwise be present throughout the inner margins of the flanges 23 and 24. Furthermore, the pressure will cause such collapse and/or compression of the rubber liner between the anchoring strips that substantially semi-cylindrical spaces as at 65 and 66 will exist. These latter spaces may be the more appreciable due to the attenuation of the liner due to its elongation between the anchoring strips into the spaces 63 and 64.

Thus, between the anchoring strips, the liner walls tightly embrace the lateral surfaces of the plug between the plug openings 29 and 30, and due to the seal afforded by the flanges 23 and 24 and ribs 25 and 26 of the liner, fluid cannot reach spaces 63 and 64 from the ports 16 and 17 when the valve is closed.

With the plug in open position, pressure exists between the sleeve and chamber walls on both sides of strips 31 and 32 so that the rubber sleeve adjacent both ports is collapsed against the plug.

In practice, it has been found that when the plug openings 38 and 39 are of circular shape, and the sleeve openings 29 and 30 are of the same circular shape, the lateral edges of the latter tend to be forced into the plug openings when the plug is being turned from open to closed position with injurious shearing effect. I have found that this effect is avoided at least a large part, when the plug openings, and preferably the sleeve openings also, are given the shape particularly shown in Figure 1. In this figure, it will be seen that the plug opening 39 is laterally somewhat elongated and substantially pointed. With this configuration, when the plug is turned, this less abrupt lateral contour of the plug openings acts to ease the collapsed sleeve portions out of these openings without injury to the rubber. It will be understood that, in the preferred embodiment of the invention, the sleeve has openings of exactly the same form and size as the plug openings. The sleeve opening 29 appears in dotted lines in Figure 2.

While the sleeve is of long wearing material, it can be readily replaced upon removal of the caps, the plug and the anchoring strips and screws.

It will be understood that the invention is by no means limited to the exact form and relation of parts shown and described. For example, while the sleeve is shown as having cylindrical inner walls it is only necessary that the walls be of circular section and that the plug be similarly shaped, and the sleeve may be made of suitable material other than rubber. I do not limit my invention to the form and manner of association of the various elements except as in the following claims.

I claim:

1. A valve comprising a casing body provided with a chamber and lateral inlet and outlet ports communicating with said chamber, a rubber sleeve lining said chamber and having openings registering with said ports, means effecting a seal between said sleeve and the chamber walls confined to zones extending axially of the sleeve and chamber between said openings, and a plug rotatable in said sleeve and having a passage adapted to connect said openings, said openings and the passage ends being laterally substantially pointed.

2. A valve comprising a casing body provided with a chamber and lateral inlet and outlet ports communicating with said chamber, a rubber sleeve lining said chamber and having openings registering with the said ports, the inner walls of said sleeve being provided with recesses extending axially of the sleeve between said openings, strips of rigid material in said recesses, means connecting said strips with the chamber walls whereby a seal is effected between said sleeve and the chamber walls confined to zones extending axially of the sleeve and chamber between said openings, means establishing a seal between the sleeve and the body at the ends of said strips, and a plug rotatable in said sleeve and having a passage adapted to connect said openings.

3. A valve comprising a casing body provided with a chamber and lateral inlet and outlet ports communicating with said chamber, the chamber walls being provided with recesses extending axially of the chamber between said ports, a rubber sleeve lining said chamber and having ribs received in said recesses, said sleeve having openings registering with said ports, means connecting said sleeve and the chamber walls through said ribs to provide a seal between said sleeve and the chamber walls confined to zones extending axially of the sleeve and chamber between said openings, means establishing a seal between the ends of said sleeve and the body, and a plug rotatable in said sleeve and having a passage adapted to connect said openings.

4. A valve comprising a casing body provided with a chamber and lateral inlet and outlet ports communicating with said chamber, the chamber walls being provided with axially extending recesses between said ports, a rubber sleeve lining said chamber and provided with ribs engaged in said recesses and having openings registering with said ports, the inner walls of said sleeve having recesses extending along said ribs, strips of rigid material in said sleeve recesses, means securing said strips to the chamber walls whereby a seal is effected between said sleeve and the chamber walls confined to zones extending axially of the sleeve and chamber between said openings, means establishing a seal between the sleeve and the body at the ends of said strips, and a plug rotatable in said sleeve and having a passage adapted to connect said openings.

5. A valve comprising a casing body provided with a chamber and lateral inlet and outlet ports communicating with said chamber, said chamber terminating in top and bottom annular shoulders, a rubber sleeve lining said chamber and having openings registering with said ports, said sleeve having external end flanges overlying said shoulders, a plug rotatable in said sleeve and having a passage adapted to connect said openings, end caps for said chamber having marginal portions overlying the sleeve flanges, and means securing said caps to said casing body and compressing said end flanges between the cap margins and said shoulders so that a seal is provided between the caps and casing body.

6. A valve comprising a casing body provided with a chamber and lateral inlet and outlet ports communicating with said chamber, a flexible sleeve lining said chamber, means establishing a seal between the ends of said sleeve and the body, means establishing a seal between said sleeve and the chamber walls confined to zones extending between said openings and extending between the end seals, and a plug rotatable in said sleeve and having a passage adapted to connect said openings.

FRANK H. MUELLER.